US005298574A

United States Patent [19]
Senn

[11] Patent Number: 5,298,574
[45] Date of Patent: Mar. 29, 1994

[54] POLY(ARYLENE SULFIDE KETONE)/POLY(ARYLENE SULFIDE SULFONE) BLOCK COPOLYMERS AND PREPARATION THEREOF

[75] Inventor: Dwayne R. Senn, Bartlesville, Okla.

[73] Assignee: Phillips Petroleum Company, Bartlesville, Okla.

[21] Appl. No.: 976,240

[22] Filed: Nov. 13, 1992

[51] Int. Cl.$^5$ .............................................. C08G 75/14
[52] U.S. Cl. ...................................... 525/471; 525/537; 524/609; 528/388
[58] Field of Search ................. 525/471, 537; 528/388

[56] References Cited

U.S. PATENT DOCUMENTS

| | | | |
|---|---|---|---|
| 4,008,203 | 2/1977 | Jones | 260/49 |
| 4,895,892 | 1/1990 | Satake et al. | 524/520 |
| 4,960,841 | 10/1990 | Kawabata et al. | 525/537 |
| 4,975,479 | 12/1990 | Satake et al. | 525/537 |

FOREIGN PATENT DOCUMENTS 41320 8/1988 Japan ........................................ 75/2

*Primary Examiner*—John C. Bleutge
*Assistant Examiner*—Helen F. Lee
*Attorney, Agent, or Firm*—Marianne H. Michel

[57] ABSTRACT

A process is provided for preparing poly(arylene sulfide ketone)/poly(arylene sulfide sulfone) block copolymers comprising: contacting poly(arylene sulfide ketone) prepolymer, at least one dihaloaromatic sulfone, a sulfur source, and a polar organic compound under polymerization conditions. The polymers thus produced exhibit crystalline properties and an increased glass transition temperature.

6 Claims, No Drawings

POLY(ARYLENE SULFIDE KETONE)/POLY(ARYLENE SULFIDE SULFONE) BLOCK COPOLYMERS AND PREPARATION THEREOF

BACKGROUND OF THE INVENTION

This invention relates to the preparation of poly(arylene sulfide ketone)/poly(arylene sulfide sulfone) block copolymers and the block copolymers thus produced.

Poly(arylene sulfide ketone)s are an important class of engineering thermoplastics. They are of commercial interest for film, fiber, moldings, and composite applications because of their high melting points, which increase their ability to withstand high temperatures, and crystallinity which provides good chemical resistance.

Poly(arylene sulfide sulfone)s are amorphous polymers and exhibit good impact strength, a lower processing temperature, and a high glass transition temperature which increases the temperatures at which the polymer can be used. They are useful in the such areas as electrical components, wire coatings, automotive parts, and the like.

It would be desirable to produce a polymer composition which exhibits the advantages of both poly(arylene sulfide ketone)s and poly(arylene sulfide sulfone)s i.e. heat stability, chemical resistance, crystallinity, high impact strength, reduced processing temperature, and high glass transition temperature.

SUMMARY OF THE INVENTION

Objects of the present invention are, therefore, to provide a process for preparing poly(arylene sulfide ketone)/poly(arylene sulfide sulfone) block copolymers and the block copolymers thus produced.

In accordance with this invention a process for preparing poly(arylene sulfide ketone)/poly(arylene sulfide sulfone) block copolymers is provided which comprises contacting poly(arylene sulfide ketone) prepolymer, at least one dihaloaromatic sulfone, a sulfur source, and a polar organic compound under polymerization conditions. In accordance with other aspects of this invention polymers produced by the above described process are provided.

DETAILED DESCRIPTION OF THE INVENTION

Poly(arylene sulfide ketone) prepolymer is prepared by contacting at lest one dihalobenzophenone, a polar organic compound, and a sulfur source under polymerization conditions. The prepolymer can then be contacted with at least one dihaloaromatic sulfone, a sulfur source, and a polar organic compound. In the alternative, prior to contacting with at least one dihaloaromatic sulfone, a sulfur source, and a polar organic compound, the prepolymer can be isolated, and optionally washed and dried.

The dihalobenzophenones which can be employed in the preparation of the poly(arylene sulfide ketone) prepolymer are represented by the formula:

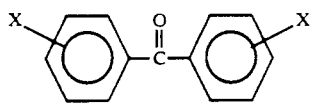

wherein each X is selected from the group of chlorine, bromine, fluorine, and iodine.

Examples of dihalobenzophenones suitable for preparing the poly(arylene sulfide ketone) prepolymer include 4,4'-dichlorobenzophenone, 4,4'-dibromobenzophenone, 4,4'-difluorobenzophenone, 4,4'-diiodobenzophenone, 2,4'-dichlorobenzophenone, 2,4'-dibromobenzophenone, 2,4'-difluorobenzophenone, 2,4'-diiodobenzophenone, and the like, and mixtures thereof. The presently preferred dihalobenzophenones are dichlorobenzophenones and 4,4'-dichlorobenzophenone is most preferred.

Generally, in preparing the poly(arylene sulfide ketone) prepolymers, the amount of dihalobenzophenone employed is in the range of 0.7 to 2.0 moles per mole of sulfur source.

The sulfur source which is typically used in preparing the poly(arylene sulfide ketone) prepolymer is an alkali metal sulfide or an alkali metal hydrosulfide. Examples of sulfur sources that can be employed in the preparation of the poly(arylene sulfide ketone) prepolymer include lithium sulfide, sodium sulfide, potassium sulfide, rubidium sulfide, cesium sulfide, lithium hydrosulfide, sodium hydrosulfide, potassium hydrosulfide, rubidium hydrosulfide, cesium hydrosulfide, and mixtures thereof. The alkali metal sulfide can be used in anhydrous form, or preferably as a hydrate, or as an aqueous mixture. Sodium sulfide or sodium hydrosulfide are preferred.

When alkali metal hydrosulfides are employed, it is preferable that a base is present. Suitable bases include alkali metal hydroxides, alkali metal carbonates and mixtures thereof. Examples of bases which can be employed include lithium hydroxide, sodium hydroxide, potassium hydroxide, sodium carbonate, potassium carbonate, rubidium carbonate, cesium carbonate and mixtures thereof. Sodium hydroxide or sodium carbonate are preferred.

If a base is employed, the moles of base per mole of alkali metal hydrosulfide is generally in the range of from about 0.5 to about 4.0 moles of base per mole of sulfur source and preferably from 0.5 to 2.0 moles of base per mole of sulfur source.

The polar organic compounds used in preparing the poly(arylene sulfide ketone) prepolymer should be substantially liquid at the reaction temperatures and pressure employed. The polar organic compounds can be cyclic or acyclic and generally have 1 to 18 carbon atoms per molecule. Suitable polar organic compounds include organic amides, lactams, ureas and sulfones such as formamide, acetamide, N-methylformamide, N,N'-dimethylformamide, N,N'-diemthylacetamide, N-ethylproionamide, N,N'-dipropylbutyramide, 2-pyrrolidone, N-methyl-2-pyrrolidone (NMP), ε-caprolactam, N-methyl-ε-caprolactan, N,N'-ethylenedi-2-pyrrolidone, hexamethylphosphoramide, tetramethylurea, sulfalone, diphenyl sulfone, and the like and mixtures thereof. Amides are preferred, and N-methyl-2-pyrrolidone is especially preferred.

The moles of polar organic compound per mole of sulfur source can vary broadly, generally from about 1 to about 24, preferably from 2 to 16, and most preferably from 2 to 12.

Optionally an alkali metal carboxylate can be employed preparing the poly(arylene sulfide ketone) prepolymer. The presence of an alkali metal carboxylate generally results in an poly(arylene sulfide sulfone)

polymer of higher molecular weight than polymers prepared in the absence of alkali metal carboxylate.

Alkali metal carboxylates that can be employed in the process of this invention can be represented by the formula $R'(CO_2M)_m$ where $R'$ is a hydrocarbyl radical selected from alkyl, cycloalkyl, aryl, and alkaryl, said hydrocarbyl radical having 1 to 20 carbon atoms, M is an alkali metal selected from the group consisting of lithium, sodium, potassium, rubidium, and cesium, and m is 1 or 2. Preferably, $R'$ is an alkyl radical having 1 to 6 carbon atoms, or a phenyl radical, and M is lithium or sodium. If desired, the alkali metal carboxylate can be employed as a hydrate or as a solution or dispersion in water.

Examples of some alkali metal carboxylates which can be employed in the preparation of the poly(arylene sulfide ketone) prepolymer include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, sodium heneicosanoate, lithium cyclohexane carboxylate, cesium cyclododecane carboxylate, sodium 3-methylcyclopentane carboxylate, potassium cyclohexylacetate, potassium benzoate, lithium benzoate, sodium benzoate, potassium m-toluate, lithium phenylacetate, sodium 4-phenylcyclohexane carboxylate, potassium p-tolylacetate, lithium 4-ethylcyclohexylacetate, sodium malonate, sodium glutarate, sodium phthalate, and mixtures thereof. The carboxylate can be prepared in situ by the reaction of the corresponding carboxylic acid with at least one alkali metal hydroxide. The presently preferred alkali metal carboxylate is sodium acetate because of its effectiveness and commercial availability.

When employed, the moles of alkali metal carboxylate per mole of sulfur source can vary broadly, generally in the range of from about 0.05 to 4, preferably from about 0.1 to about 2, and most preferably from 0.15 to 1.5.

Although the reaction temperature at which the prepolymerization is conducted can vary over a considerable range, generally it will be within the range of from about from 150° C. to about 350° C., and preferably from 175° C. to 275° C. The reaction time can vary widely, depending in part on the reaction temperature, but generally will be within the range of from about 10 minutes to about 5 hours, preferably from 10 minutes 3 hours. The pressure will generally be within the range of about 0 psig to about 300 psig (0-2.1 MPa), preferably 100 psig to about 250 psig (0.7-1.7 MPa).

The poly(arylene sulfide ketone) prepolymer can be separated from the reaction mixture or the prepolymer and reaction mixture can be retained in the reactor and subsequently contacted with the dihalosulfide sulfone, sulfur source and polar organic compound. If the poly(arylene sulfide/ketone) prepolymer is separated from the reaction mixture, any method known to those of ordinary skill in the art can be employed. One suitable method employs the addition of a separation agent such as water, in order to separate the polymer from the polar organic compound and non-polymeric liquid components and unconsumed reactants. The prepolymer can then be washed with water and optionally water-miscible solvents such as acetone or methanol in order to remove impurities and by-product salts.

Dihaloaromatic sulfones employed in the preparation of the poly(arylene sulfide ketone)/poly(arylene sulfide sulfone) block copolymer can be represented by the formula

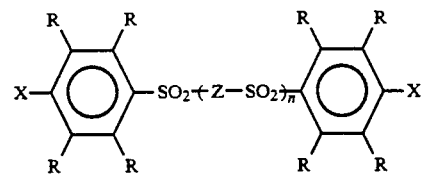

where each X is selected from the group consisting of fluorine, chlorine, bromine, and iodine; Z is a divalent radical selected from the group consisting of

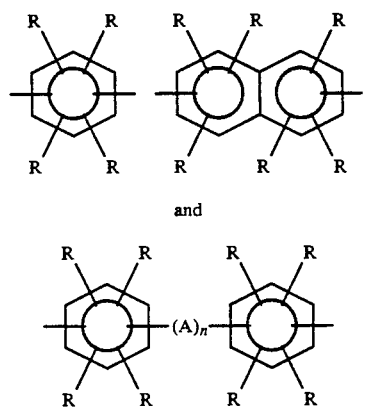

and where each n is 0 or 1; A is selected from the group consisting of oxygen, sulfur, sulfonyl, and $CR_2$; and each R is selected from the group consisting of hydrogen and alkyl radicals having 1 to 4 carbon atoms, the total number of carbon atoms in all the R groups in the molecule being 0 to 12. Preferably n is 0.

Examples of suitable dihaloaromatic sulfones that can be employed in the preparation of the poly(arylene sulfide ketone)/poly(arylene sulfide sulfones) block copolymer include bis(p-fluorophenyl)sulfone; bis(p-chlorophenyl)sulfone; bis(p-bromophenyl)sulfone; bis(p-iodophenyl)sulfone; p-chlorophenyl p-bromophenylsulfone; p-iodophenyl 3-methyl-4-flurophenyl sulfone; bis(2-methyl-4-chlorophenyl)sulfone; bis(2,5-diethyl-4-bromophenyl)sulfone; bis(3-isopropyl-4-iodophenyl)sulfone; bis(2,5-dipropyl-4-chlorophenyl)sulfone; bis(2-butyl-4-fluorophenyl)sulfone; bis(2,3,5,6-tetramethyl-4-chlorophenyl)sulfone; 2-isobutyl-4-chlorophenyl 3'-butyl-4'-bromophenyl sulfone; 1,4-bis(p-chlorophenyl-sulfonyl)benzene; 1-methyl-2,4-bis(p-fluorophenylsulfonyl)benzene; 2,6-bis(p-bromophenylsulfonyl)naphthalene, 7-ethyl-1,5-bis(p-iodophenylsulfonyl)naphthalene; 4,4'-bis(p-chlorophenylsulfonyl)biphenyl; bis[p-(p-bromophenylsulfonyl)phenyl]ether; bis[p-(p-chlorophenylsulfonyl)phenyl]sulfide; bis[p-(p-chlorophenylsulfonyl)phenyl]sulfone; bis[p-(p-bromophenylsulfonyl)phenyl]methane; 5,5-bis[3-ethyl-4-(p-chlorophenylsulfonyl)phenyl]nonane, and the like, and mixtures thereof. The presently preferred dihaloaromatic sulfones are dichloroaromatic sulfones, and bis(p-chlorophenyl)sulfone is most preferred.

Generally, in preparing the block copolymers, the amount of dihaloaromatic sulfone employed is in the range of 0.7 to 2.0 moles per mole of sulfur source. The amount of dihaloaromatic sulfone relative to the poly(phenylene sulfide ketone) prepolymer can vary widely, depending on the characteristics desired in the final block copolymer. Generally, the amount of dihaloaromatic sulfone is in the range of from about 0.01 to about 100 moles of dihaloaromatic sulfone per mole poly(phenylene sulfide ketone) prepolymer. Increasing amounts of dihaloaromatic sulfone produce block copolymer having higher glass transition temperatures. Such copolymers are suitable for high temperature uses. In preparing a crystalline block copolymer, the amount of dihaloaromatic sulfone is preferably in the range of from 0.01 to 3 moles of dihaloaromatic sulfone per mole poly(phenylene sulfide ketone) prepolymer.

Sulfur sources which can be employed in the preparation of the poly(arylene sulfide ketone)/poly(arylene sulfide sulfone) block copolymer are those described above in the preparation of the poly(arylene sulfide ketone) prepolymer. The sulfur source can be the same or different from the sulfur source employed in preparing the prepolymer. The preferred sulfur sources are sodium sulfide or sodium hydrosulfide.

The polar organic compounds used in preparing the poly(arylene sulfide ketone)/poly(arylene sulfide sulfone) block copolymers are those described above in the preparation of the poly(arylene sulfide ketone) prepolymer. The polar organic compounds can be the same or different from those employed in preparing the prepolymer. Amides are preferred, and N-methyl-2-pyrrolidone is especially preferred.

The moles of polar organic compound per mole of sulfur source can vary broadly, generally from about 1 to about 24, preferably from 2 to 16, and most preferably from 2 to 12.

Optionally an alkali metal carboxylate can be employed in the preparation of the block copolymer. Usage of an alkali metal carboxylate generally results in a copolymer of higher molecular weight than copolymers prepared in the absence of alkali metal carboxylate.

Alkali metal carboxylates that can be employed in the preparation of the block copolymer can be the same or different from those in the prepolymerization step. The presently preferred alkali metal carboxylate is sodium acetate because of its effectiveness and commercial availability.

The moles of alkali metal carboxylate per mole of sulfur source can vary broadly, generally in the range of from about 0.05 to about 4, preferably from about 0.1 to about 2, and most preferably from 0.15 to 1.5.

Although the reaction temperature at which the copolymerization is conducted can vary over a considerable range, generally it will be within the range of about 150° C. to about 300° C., preferably 175° C. to 250° C. The reaction time can vary widely, depending in part on the reaction temperature, but generally will be within the range of from about 10 minutes to about 72 hours, preferably from 1 hour to 8 hours. The pressure will generally be within the range of about 0 psig to about 300 psig (0–2.1 MPa), preferably 100 psig to about 250 psig (0.7–1.7 MPa).

The block copolymers can be separated from their reaction mixture in any manner known to those of ordinary skill in the art. One suitable method employs the addition of a separation agent, such as water, in order to separate the polymer from the polar organic compound and non-polymeric liquid components and unconsumed reactants. The polymer can then be washed with water and optionally water-miscible solvents such as acetone or methanol in order to remove impurities and by-product salts. If desired, at least a portion of the washing can be conducted at an elevated temperature, for example up to about 200° C.

The final recovered poly(arylene sulfide ketone)/poly(arylene sulfide sulfone) block copolymer can optionally have other ingredients incorporated including extenders, fillers, pigments, plasticizers, stabilizers etc. In certain applications, it may be desirable to add additional strength to the polymer. Polymer strength can be increased by incorporating strengtheners such as fibers into the polymer to form a composite material. Preferred strengtheners, due to their effectiveness, are inorganic fibers such as asbestos, glass and carbon and the like. The polymers produced by the process of the invention are useful in the production of coatings, film, molded objects, and fibers. The block copolymers are also useful as compatibilizers in polymer blends.

The following example will serve to show the present invention in detail by way of illustration and not by way of limitation.

EXAMPLE

The following example demonstrates the preparation and thermal transition properties of various polymers. Except where noted, poly(phenylene sulfide sulfone) (PPSS), poly(phenylene sulfide ketone) (PPSK) prepolymer, PPSK, PPSK/PPSS random copolymers, and PPSK/PPSS block copolymers were prepared in one-liter stainless-steel autoclave reactors equipped with an anchor type stirrer. Poly(phenylene sulfide ketone)/poly(phenylene sulfide sulfone) block copolymers (PPSK/PPSS) were prepared using poly(phenylene sulfide ketone) (PPSK) prepolymer. The PPSK prepolymer was prepared in situ in Run 105 and as an isolated prepolymer in Run 106.

PPSS polymer, Run 101, was prepared by charging a two-gallon stainless steel stirred autoclave reactor with 380.2 g (4.00 mol) as an aqueous mixture containing 58.98 weight percent NaSH; 1160.17 g (4.04 mol) bis(4-chlorophenyl)sulfone (BCPS); 1130.56 g (10.67 mol) sodium carbonate; 328.12 g (4.00 mol) sodium acetate; 108.00 g (6.00 mol) deionized water; and 1586.1 g (16.00 mol) N-methyl-2-pyrrolidone (NMP). The reactor was sealed and purged four times with nitrogen. The agitator rate was adjusted to 600 rpm. The temperature was raised to 200° C. and held for 3 hours. The reaction was quenched by adding 300–400 mL water while maintaining the temperature of the reaction mixture at or above 180° C. The reactor was cooled by forcing air through the cooling coils overnight. The solid product was recovered and washed with hot deionized water until the filtrate was clear, then with 3 L deionized water at 180° C. for 30 minutes, filtered and dried. The polymer was dried in a vacuum oven at 150° C. The inherent viscosity was 0.48 dL/g in NMP. The melt flow at 343° C. at a 5 minute holding time was 2.6 g/10 minutes measured according to ASTM D 1238-86.

PPSK polymer, Run 102, was prepared by charging a two-gallon stainless-steel reactor with 2.03 mol NaSH as an aqueous mixture containing 59.15 wt % NaSH; 2.15 moles water; 2.00 moles sodium hydroxide; 2.00 moles 4,4′dichlorobenzophenone (DCBP); and 24.00 moles N-methyl-2-pyrrolidone. The reactor was sealed and purged with nitrogen and the temperature raised to 250° C. and held for one hour. The reactor was cooled to 160° C. and water was distilled out through a condenser fitted to the reactor. During the dehydration, the temperature was gradually increased to 200° C. The reactor was then charged with 36 mL of water. The reactor was heated to 250° C. and held for two hours. Polymerization was completed at 270° C. for 30 minutes, then allowed to cool overnight. The polymer was suspended in tap water and collected by filtration. Following three cold water washings, the polymer was washed with 1 wight percent sodium hydroxide at 120° C. and filtered. After a cold water wash the polymer was washed in 5 weight percent calcium chloride at 185° C. for 30 minutes. The polymer was filtered and given several cold water washings and dried in a forced air oven at 100° C. for 6 hours. The yield was 94%. The melt flow at 343° C. at a 5 minute hole time was 30 g/10 minutes.

Random PPSS/PPSK copolymer, Run 103, was prepared by charging the reactor with 198.27 g (2.000 mol) NMP; 23.893 g (0.250 mol) NaSH as an aqueous mixture containing 59.15 wt % NaSH; 52.995 g (0.500 mol) $Na_2CO_3$; 20.509 g (0.250 mol) sodium acetate (NaOAc); 35.90 g (0.125 mol) bis(4-chlorophenyl)sulfone (BCPS); 31.39 g (0.125 mol) 4,4'dichlorobenzophenone (DCBP); and 30.54 g (2.351 total mol) $H_2O$. The reactor was sealed and purged four times with nitrogen and the temperature raised to 200° C. which gave a pressure of 175 psig and held for 3 hours. The reactor was cooled by running water through the cooling coils until the reactor reached 35° C. The solid product was recovered and washed twice with hot water, then with hot 3% acetic acid, and then with hot water. The solid product was then rinsed with acetone followed by a hot water rinse. The polymer was then dried in a vacuum oven at 150° C. The inherent viscosity was 0.40 dL/gin NMP. The melt flow at 343° C. at a 5 minute hold time was 44 g/10 minutes ASTM D 1238-86.

In Run 104, PPSK/PPSS block copolymer was prepared employing in situ PPSK prepolymer. PPSK prepolymer was prepared by charging the reactor with 148.70 g (1.500 mol) N-methyl-2-pyrrolidone; 11.85 g NaSH as an aqueous mixture containing 59.15 wt % NaSH, 13.25 g (0.125 mol) $Na_2CO_3$; 31.39 g (0.125 mol) 4,4'-dichlorobenzophenone (DCBP): and 5.22 g (0.290 mol) $H_2O$. The reactor was sealed and purged four times with nitrogen and the temperature raised to 190° C. which gave a pressure of 120 psig and held for 30 minutes. The reactor was cooled with ice and water was run through the cooling coils until the reactor reached 35° C. The reactor was then charged with 99.13 g (1.000 mol) NMP; 11.85 g (0.125 mol) NaSH as an aqueous mixture containing 59.15 wt % NaSH; 26.50 g (0.250 mol) $Na_2CO_3$; 10.25 g (0.125 mol) sodium acetate (NaOAc): 35.90 g (0.125 mol) bis(4-chlorophenyl)sulfone (BCPS); and 35.81 g (1.988 mol) $H_2O$. The reactor was purged four times with nitrogen and heated to 200° C. giving a pressure of 175 psig. The temperature and pressure were held for 2 hours. The reactor was cooled by running water through the cooling coils. The solid product was recovered and washed twice with hot water, then with hot 3 wt. % acetic acid, and then with hot water. The solid product with then rinsed with acetone followed by a hot water rinse. The polymer was then dried in a vacuum oven at 150° C. 57.25 g of polymer was recovered which equalled 99.4% yield. The inherent viscosity was 0.20 dL/g at 30° C. measured in a #200 viscometer using a 0.5 weight percent solution is concentrated sulfuric acid as solvent.

A second PPSK/PPSS block copolymer, Run 105, was prepared by contacting BCPS and isolated PPSK prepolymer. The prepolymer was prepared by charging the reactor with 148.70 g (1.500 mol) N-methyl-2-pyrrolidone; 11.85 g NaSH as an aqueous mixture containing 59.15 wt % NaSH; 13.25 g (0.125 mol) $Na_2CO_3$; 31.39 g (0.125 mol) 4,4'-dichlorobenzophenone (DCBP); and 5.22 g (0.290 mol) $H_2O$. The reactor was sealed and purged four times with nitrogen and the temperature raised to 190° C., which gave a pressure of 120 psig, and held for 30 minutes. The reactor was cooled by running water through the cooling coils until the reactor reached 35° C. The solid product was recovered and washed twice with hot water, then with hot 3 wt. % acetic acid, and then with hot water. The solid product was then rinsed with acetone followed by a hot water rinse. The PPSK prepolymer was then dried in a vacuum oven at 150° C. Subsequently, a reactor was charged with 192.27 g (2.000 mol) NMP; 11.73 g (0.124 mol) NaSH as an aqueous mixture containing 59.15 wt % NaSH; 26.50 g (0.250 mol) $Na_2CO_3$; 10.25 g (0.125 mol) sodium acetate (NaOAc); 35.90 g (0.125 mol) bis(4-chlorophenyl)sulfone (BCPS); 26.27 g (0.124 mol) poly(phenylene sulfide ketone) prepolymer, and 35.81 g (1.988 mol) $H_2O$. The reactor was purged four times with nitrogen and heated to 200° C. giving a pressure of 160 psig. The temperature and pressure were held for 3 hours. The reactor was allowed to cool to room temperature. The solid product was recovered and washed twice with hot water, then with hot 3 wt. % acetic acid, and then with hot water. The solid product was then rinsed with acetone followed by a hot water rinse. The polymer was then dried in a vacuum oven at 150° C. 55.08 g of polymer was recovered which equaled 96.6 % yield. The inherent viscosity measured as described in 101, was 0.30 dL/g in sulfuric acid.

Thermal transitions were measured employing a Perkin-Elmer DAC-2C differential scanning calorimeter equipped with a computerized data system and a Perkin-Elmer TADS-1 plotter. The polymer sample was heated at a rate of 20° C./minute. In Table 1, $T_g$ is the glass transition temperature in °C. $T_{cc}$ is the cold crystallizaton temperature in °C. $T_{mc}$ is the melt crystallization temperature (upon cooling of the melt at 20° C./minute) in °C. $T_m$ is the melt temperature in °C. Thermal transitions of the various polymers prepared are indicated in Table 1.

TABLE 1

| Run | Polymer Composition | Tg °C. | Tcc °C. | Tmc °C. | Tm °C. |
|---|---|---|---|---|---|
| 101 | PPSS | 220 | — | — | — |
| 102 | PPSK | 144 | 185 | 300 | 348 |
| 103 | Random Copolymer 50/50 PPSK/PPSS block copolymer | 179 | — | — | — |
| 104 | Block Copolymer | 189 | 212 | 292 | 329 |
| 105 | Block Copolymer | 155/201* | 198 | 295 | 340 |

*a second glass transition was observed on cooling

The results in Table 1 demonstrate that a crystalline block copolymer can be prepared by contacting a poly(phenylene sulfide ketone) prepolymer and bis(4-chlorophenyl)sulfone, Runs 104 and 105. The block copolymer prepared in this manner was crystalline in form, similar to poly(phenylene sulfide ketone), Run 102, and exhibited higher glass transition temperature, similar to poly(phenylene sulfide sulfone), Run 101. Thus retaining the desirable characteristics of both substituents of the block copolymer. Run 103, random block copolymer, exhibits a reduced glass transition temperature and is amorphous.

While this invention has been described in detail for the purpose of illustration, it is not to be construed as limited thereby, but is intended to cover all changes and modification within the spirit and scope thereof.

That which is claimed is:

1. A process for preparing poly(arylene sulfide ketone)/polyarylene sulfide sulfone) block copolymers consisting essentially of:

reacting a mixture consisting essentially of a poly(phenylene sulfide ketone) prepolymer, bis(p-chlorophenyl)sulfone, sodium hydrosulfide, sodium acetate, and N-methyl-2-pyrrolidone under polymerization conditions;

wherein said prepolymer is prepared by reacting a mixture consisting essentially of 4,4'-dichlorobenzophenone, sodium hydrosulfide, sodium carbonate, and N-methyl-2-pyrrolidone under polymerization conditions prior to said contacting with said bis(p-chlorophenyl)sulfone;

wherein said poly(phenylene sulfide sulfone) is present in an amount in the range of from 0.01 to 3 moles per mole of poly(phenylene sulfide ketone).

2. A process according to claim 1 further comprising recovering said prepolymer prior to said contacting with said bis(p-dichlorophenyl)sulfone.

3. A process according to claim 1 wherein said polymerization conditions for preparing said prepolymer include a temperature in the range of from about 150° C. to about 300° C. and for a time of about 10 minutes to about 5 hours.

4. A process according to claim 3 wherein said polymerization conditions for preparing said prepolymer include a temperature in the range of from 175° C. to about 275° C. and for a time of 10 minutes to about 3 hours.

5. A block copolymer produced according to the process of claim 1.

6. A block copolymer produced according to the process of claim 2.

* * * * *

UNITED STATES PATENT AND TRADEMARK OFFICE
CERTIFICATE OF CORRECTION

PATENT NO. : 5,298,574
DATED : March 29, 1994
INVENTOR(S) : Dwayne R. Senn

It is certified that error appears in the above-identified patent and that said Letters Patent is hereby corrected as shown below:

Column 10, claim 2, line 6, delete "bis(p-dichlorophenyl)sulfone" and insert --- bis(p-chlorophenyl)sulfone --- therefor.

Signed and Sealed this

Second Day of August, 1994

Attest:

BRUCE LEHMAN

*Attesting Officer*  Commissioner of Patents and Trademarks